(12) United States Patent
Sulatycki et al.

(10) Patent No.: US 12,287,882 B2
(45) Date of Patent: Apr. 29, 2025

(54) FRAMEWORK FOR AUTOMATED PENETRATION TESTING

(71) Applicant: Twilio Inc., San Francisco, CA (US)

(72) Inventors: Rohini Sulatycki, Lake Worth, FL (US); Vladimir Wolstencroft, New York, NY (US)

(73) Assignee: Twilio Inc., San Francisco, CA (US)

( * ) Notice: Subject to any disclaimer, the term of this patent is extended or adjusted under 35 U.S.C. 154(b) by 792 days.

(21) Appl. No.: 17/302,828

(22) Filed: May 13, 2021

(65) Prior Publication Data

US 2021/0357507 A1    Nov. 18, 2021

Related U.S. Application Data

(60) Provisional application No. 63/025,437, filed on May 15, 2020.

(51) Int. Cl.
| | |
|---|---|
| *G06F 21/57* | (2013.01) |
| *G06F 9/54* | (2006.01) |
| *H04L 9/40* | (2022.01) |

(52) U.S. Cl.
CPC ............ *G06F 21/577* (2013.01); *G06F 9/541* (2013.01); *H04L 63/1433* (2013.01); *G06F 2221/034* (2013.01)

(58) Field of Classification Search
CPC ............ G06F 21/577; G06F 2221/034; H04L 63/1433
See application file for complete search history.

(56) References Cited

U.S. PATENT DOCUMENTS

| | | | | |
|---|---|---|---|---|
| 7,228,566 B2* | 6/2007 | Caceres | .............. | H04L 63/1433 709/219 |
| 8,099,787 B2* | 1/2012 | Vasudeva | .............. | G06F 21/577 726/4 |
| 2009/0320137 A1* | 12/2009 | White | .................. | H04L 63/1433 707/999.102 |
| 2017/0019421 A1* | 1/2017 | Hebert | ................... | G06F 21/577 |
| 2021/0243216 A1* | 8/2021 | Shivanna | ............ | H04L 63/1433 |

* cited by examiner

*Primary Examiner* — Zachary A. Davis
(74) *Attorney, Agent, or Firm* — Schwegman Lundberg & Woessner, P.A.

(57) ABSTRACT

In one aspect, a distributed security-testing infrastructure is used for attack-tree modeling for penetration testing. An API framework, fully distributed and scalable, is used to access the attack-tree modeling based on attack trees, or decision trees, to emulate attacker behavior and decisions taken during an attack. The API framework allows developers to implement the security tools into existing software to perform actions based on desired conditions as defined by the nodes of the attack tree. For example, APIs can be used along with if/else-type statements to create advanced threat models that react based on given conditions to test multiple paths through the attack tree. Nodes of the attack tree are configured to perform actions based on the output of previous attacks in other nodes. This flexible design allows for the easy modification of the threat modeling system to test new scenarios.

20 Claims, 10 Drawing Sheets

FRAMEWORK FOR AUTOMATED PENETRATION TESTING

CLAIM OF PRIORITY

This application claims priority from U.S. Provisional Patent Application No. 63/025,437, filed May 15, 2020, and entitled "Framework for Automated Penetration Testing." This provisional application is herein incorporated by reference in its entirety.

TECHNICAL FIELD

The subject matter disclosed herein generally relates to methods, systems, and machine-readable storage media for testing security of systems, and particularly for penetration testing.

BACKGROUND

Tools for testing the security of a computing device or system are difficult to use. For example, many are invoked via command line or web-based tools that require constant tuning and configuration management. Further, these tools rarely cover the attack surface needed and are not scalable as these tools are often unable to provide a path of attack specific to the target. Some tools will provide functionality to either run specific tests and/or tune a test but not a specific path of tests. In particular, there is little available coverage for testing the security of telephony protocols.

This problem is particularly difficult for small companies with limited IT resources that usually cannot afford a full-time dedicated security expert.

What is needed are penetration-testing tools that are easy to use, easy to manage, and provide comprehensive testing of systems.

BRIEF DESCRIPTION OF THE DRAWINGS

Various of the appended drawings merely illustrate example embodiments of the present disclosure and cannot be considered as limiting its scope.

DETAILED DESCRIPTION

Example methods, systems, and computer programs are directed to penetration testing of computing systems. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one aspect, a distributed application programming interface (API) framework for a security tool is presented. The API framework is fully distributed and scalable. The API can be used by developers of security solutions for easy access to a distributed security-testing infrastructure, which is implemented using containers that allow easy scalability in a distributed fashion.

In another aspect, the distributed security-testing infrastructure is used for attack-tree modeling for penetration testing. The API framework is used to access the attack-tree modeling based on attack trees, or decision trees, to emulate attacker behavior and decisions taken during an attack. The attack trees can be used to emulate a wide variety of attacks, from general purpose to bespoke attacks. The API framework allows developers to implement the security tools into existing software to perform actions based on desired conditions as defined by the nodes of the attack tree. For example, APIs can be used along with conditional programming statements, such as if/else-type statements, to create advanced threat models that react based on given conditions to test multiple paths through the attack tree. In some embodiments, parent nodes of the attack tree are configured to perform actions based on the output of child nodes, and, in other embodiments, child nodes of the attack tree are configured to perform actions based on the output of parent nodes. This flexible design allows for the easy modification of the threat modeling system to test new scenarios.

One general aspect includes a method that includes an operation for receiving, by a penetration manager, a request to perform a penetration test. The request comprises a configuration file defining an attack tree for performing the penetration test, and the attack tree is a representation of a tree structure with nodes that represent corresponding attacks. Further, the method includes an operation for performing attacks on the nodes based on the attack tree, where results of the attack in a node are passed to a next-level node until a final node is reached. Nodes are configured to perform the corresponding attack based on attack outputs from previous attacks. The method further includes an operation for determining, that the penetration test is successful based on successfully executing the attack at the final node.

Figure 1:
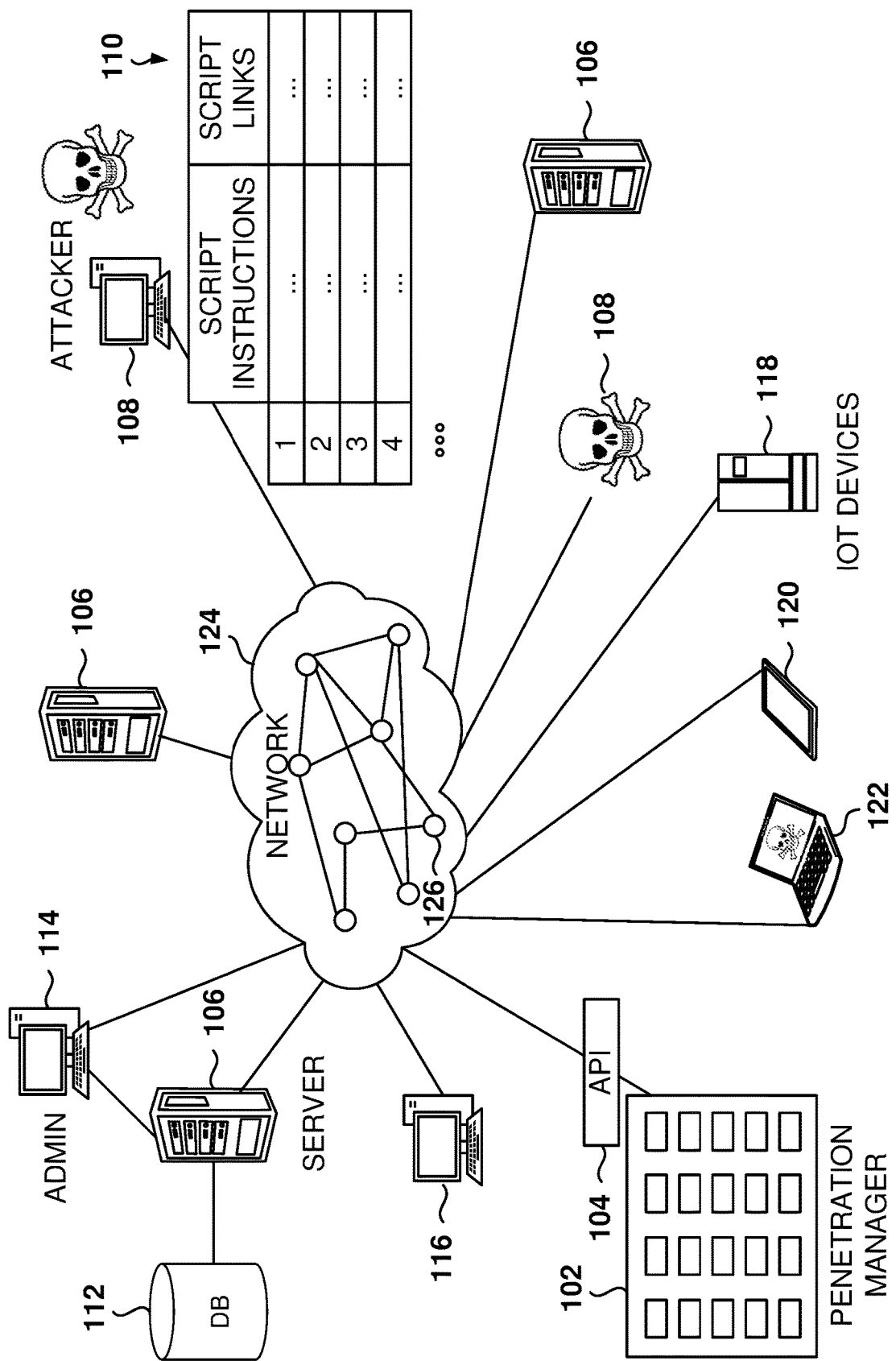
FIG. 1 illustrates dynamics for a penetration attack to network and computer resources, according to some example embodiments.

FIG. 1 illustrates dynamics for a penetration attack to network and computer resources, according to some example embodiments. An attacker 108 may target any device on the network 124 including not only the connected devices, but also the network devices 126 (e.g., router) that provide the network infrastructure.

The devices under attack may include a server 106, a desktop 116, a laptop 122, a tablet 120, IoT devices 118 (e.g., refrigerator), etc. The attacker 108 may attack from her own computing device or from other infected devices, such as a laptop 122 of another user. The server 106 may be attached to an admin station 114 and database 112. The attacker 108 may attack the server 106 itself or any other attached devices, like the admin station 114 and database 112.

In order to perform attacks on devices, the attacker 108 may use a plurality of tools, typically scripts with instructions and links as illustrated in script table 110. Each script performs a sequence of operations to test one vulnerability. Some examples include web application scanners (e.g., Burp, ZAP), port scanners (e.g., nmap, masscan), telephony operations (e.g., SIP Vicious, SS7sploit), commercial offerings (e.g., Nessus, Qualys), exploit tools (e.g., Metasploit).

However, it is complicated to manage and support this variety of tools. For example, free tools are mainly command line with complex dependencies. The tools require constant tuning and configuration management. The commercial tools rarely cover the attack surface needed and focus on "hosing down your systems." The commercial tools attempt to cover aspects of web application attacks, for which there are many nuances. For example, testing a web application that has an API as an input is different than testing a web-based form input. This means executing unnecessary tests that are time consuming and produce false positives. Also, manual reviews and custom scripts can be effective and targeted but not scalable. For telecom providers, there is little coverage for testing telephony protocols. Further, it is difficult to add custom inputs or target selection. Also, these tools do not provide APIs for remote access, and if there is an API, it tends to be difficult to use and lacking support.

The penetration manager 102 provides services for penetration testing of any computer device. The penetration manager 102 is implemented in a distributed fashion to be able to scale and perform multiple tests in parallel. The penetration testing includes reconnaissance, vulnerability identification, exploitation, and reporting. Most commercially-available tools scale by having agents perform the attacks and tests, and then upload results to a centralized processing system for analysis. This may require communicating sensitive data over possibly unsecured networks. Embodiments perform analysis and tests locally, with no data being pushed to remote locations, and not requiring access to cloud infrastructure or third-party systems. Further, the results are also asynchronously managed and delivered, either via call back APIs, or via the standard API for reporting download.

The penetration manager 102 provides an API 104 so users connected over the network 124 can request penetration testing to any network-connected device. In some example embodiments, the attack tree (e.g., the configuration of the tool) is also provided in the API request as a POST parameter.

Figure 2:
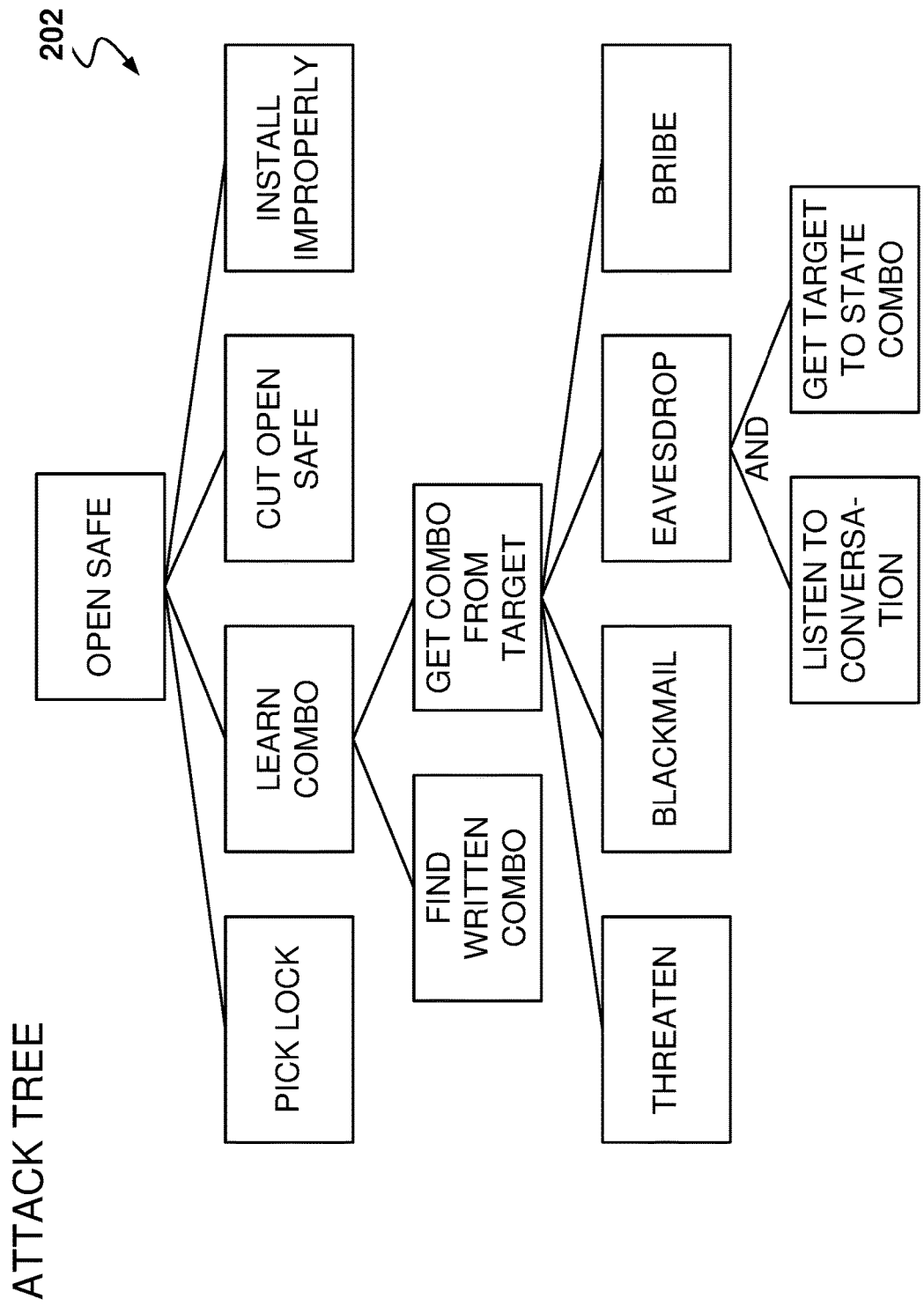
FIG. 2 is an example of an attack tree.

FIG. 2 is an example of an attack tree 202. Attack trees provide a formal, methodical way of describing the security of systems, based on varying attacks. The use of attack trees is a way of modeling attacker actions and deciding the level of sophistication of the attack to be tested. Embodiments use attack trees to programmatically model tactics, techniques, and procedures (TTPs) that attackers use. For example, attacks against a system are represented in a tree structure, with the goal as the root node and different ways of achieving that goal as leaf nodes.

The shown attack tree 202 is a simple attack tree against a physical object, in this example a safe box. The goal of the attack is to open the safe (top node). The level below the top node shows different ways to open the safe: attackers can pick the lock, learn the combination, cut open the safe, or install the safe improperly so that it can easily be opened later. The attack tree 202 is traversed upward, that is, from child nodes towards the root node, but other attack trees may be traversed downward, such as the attack tree illustrated in FIG. 6A.

In the third level of the attack tree, to learn the combination, the attacker either has to find the combination written down or get the combination from the safe owner, and so on. Each node becomes a subgoal, and children of that node are ways to achieve that subgoal. Of course, the illustrated attack tree 202 is just a sample attack tree, and an incomplete one at that.

It is noted that there are AND nodes and OR nodes. In FIG. 2, every unlabeled branch is an OR node, unless it is labeled as an AND node. OR nodes are alternatives, e.g., the four ways to open the safe. AND nodes represent different steps toward achieving the same goal. To eavesdrop on someone saying the safe combination, attackers have to eavesdrop on the conversation AND get safe owners to say the combination. Attackers can't achieve the goal unless both subgoals are satisfied.

When dealing with computer systems, attack trees define a goal (e.g., compromise a server by getting root access) and one or more operations to achieve the goal. Then, at each level, each operation may be achieved by executing one particular attack or as a result of a chain of other attacks forming a path from the nodes below.

In some example embodiments, each node is executed by running a penetration tool or attack, such as by scanning all the ports of the device to find a vulnerability. If a node succeeds in the particular attack, the results may be passed to the next level so the higher node can perform a new attack based on the information provided, e.g., attacking an open port to gain access to memory.

Figure 3:
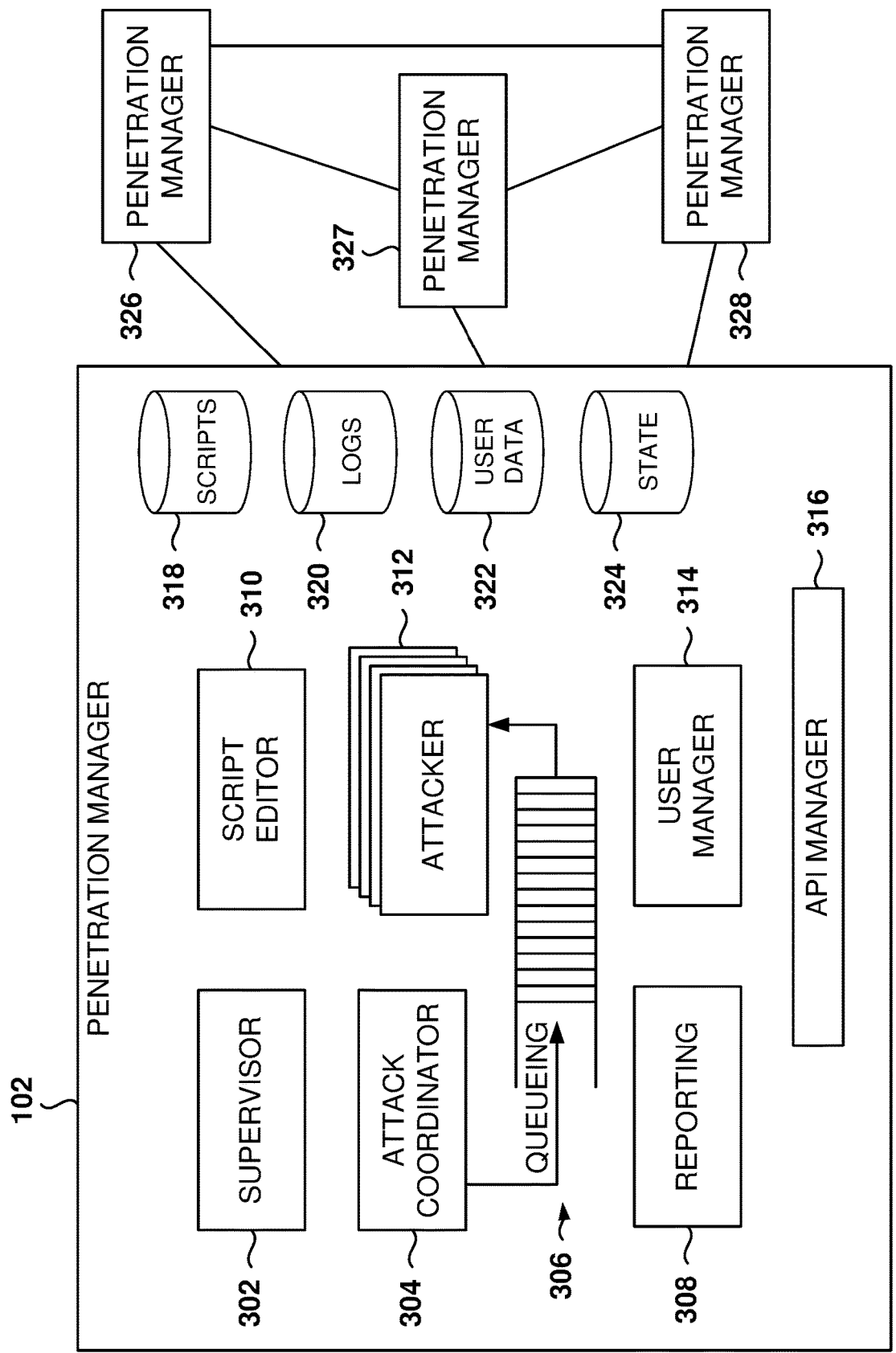
FIG. 3 is a sample architecture for a distributed penetration manager, according to some example embodiments.

FIG. 3 is a sample architecture for a distributed penetration manager, according to some example embodiments. In some example embodiments, the penetration manager 102 includes a supervisor 302, an attack coordinator 304, a reporting module 308, a script editor 310, a plurality of attackers 312, a user manager 314, an API manager 316, and a plurality of databases. The databases include a scripts database 318, a logs database 320, a user data database 322, and a state data database 324. The penetration manager 102 coordinate activities with other penetration managers 326-328 for a distributed implementation architecture.

The supervisor 302 coordinates the activity of the other modules. The attack coordinator 304 determines which attacks (e.g., penetration-testing attacks) to perform at a given time based on a configured attack tree. The attack coordinator 304 queues the attacks in queue 306, which is a distributed queue such that the attacks may be performed by attackers 312 in the same penetration manager 102 or another penetration manager. Further, the supervisor 302 can act on information obtained from previously executed nodes, which allows for more targeted tests and fewer false positives. The fact that the configuration file supplied by the user is what is used to make those decisions, as opposed to it being coded into the logic is also one of the unique features. The user is selecting what tests to run, and also selecting the logic and execution paths of those selected tests.

The attack coordinator 304 implements penetration testing defined by attack trees by implementing attacker playbooks, which are the steps attackers take to compromise systems.

The attackers 312 perform attacks, which are the penetration-testing tools. The attacker 312 may be implemented as a virtual machine within the same device or have different computing devices executing different attackers.

Some example attack tools include NMAP and NSE scripts (e.g., brute-force, known common vulnerabilities and exposures (CVE®) exploits), Masscan, SIPVicious, malicious file upload, SMPP fuzzer, internal roles repository, and IP asset repository API parsing for target generation, slack bot alerting and slack alert on search, threat modeling, Nikto application scanner, customizable SIP Fuzzer, Burp/ZAP API integration, Responder, IKE VPN, and Nightwatch integration.

The script editor 310 manages the scripts database 318, also referred to herein as tools or modules, to be used by the attackers and provides functionality for adding, deleting, and editing the tools. One example script may be to test a telecommunications device on a network, such as by testing the communication protocol vulnerabilities (e.g., SCADA, IPv6).

The user manager manages the user interface for accessing the penetration manager 326 and includes configuring users authorized to access the system. The API manager 316 handles requests received via the API interface.

The logs database 320 keeps a record of the activities of the penetration manager 102. The user data database 322 maintains the data for the users of the system, and the state data database 324 keeps track of the state of the different penetration tests. In some example embodiments, the logs and outputs are stored in JavaScript Object Notation (JSON) format, but other formats may also be used. In some example embodiments, the user credentials may be obtained through command line parameters.

The penetration manager 102 infrastructure is distributed and scalable. The penetration manager 102 allows asynchronous calling of processes or systems and is able to return information on currently running attacks or scans. Further, the penetration manager 102 is API-driven for ease of use and integration into systems. The reporting module 308 provides reports that include the results of the penetration attacks.

It is noted that the embodiments illustrated in FIG. 3 are examples and do not describe every possible embodiment. Other embodiments may utilize different components, fewer components, or additional components, or combine the functionality of several components into one. The embodiments illustrated in FIG. 3 should therefore not be interpreted to be exclusive or limiting, but rather illustrative.

Figure 4:
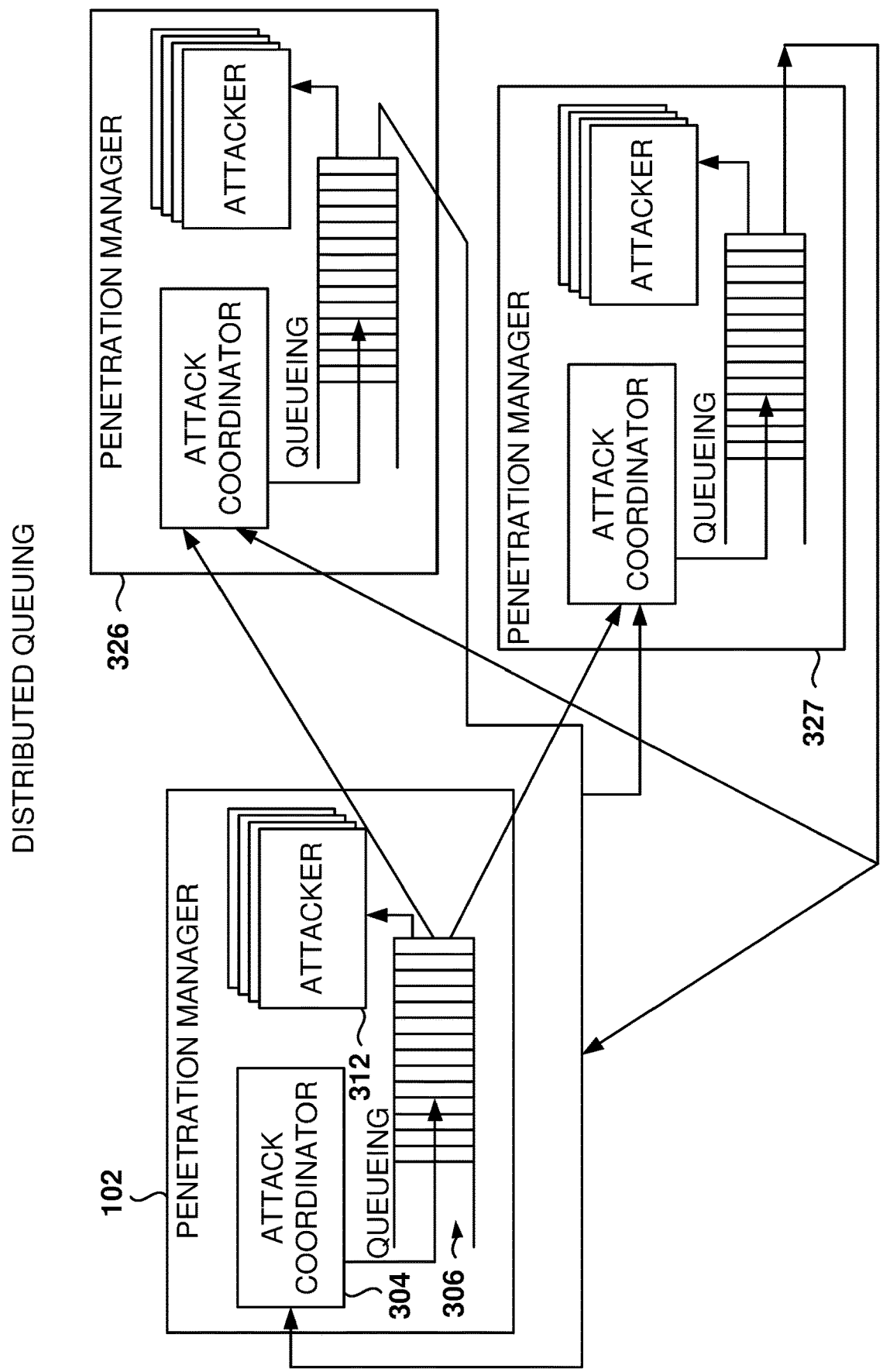
FIG. 4 illustrates the distributed queuing of attacks for multiple penetration managers, according to some example embodiments.

FIG. 4 illustrates the distributed queuing of attacks for multiple penetration managers, according to some example embodiments. In the illustrated example, three penetration managers 102, 326, and 327 cooperate to provide the distributed infrastructure for penetration testing.

Each penetration manager includes a respective queue 306 waiting for an attacker 312 to become available. The attack coordinator 304 can send the attacks to be performed by any of the attackers 312 at the same penetration manager where the attack coordinator 304 resides or to a different penetration manager.

It is noted that some attacks may take a long time, such as days. By having a distributed architecture, the long-running attacks will not stop other attacks requiring less time to be performed. Further, the attack coordinator is in charge of chaining attacks, as defined by the attack tree. Based on the results of one attack or scan, a new attack may be initiated using as input the information obtained by the previous attack.

In some example embodiments, the penetration manager 102 is dockerized. Dockerizing an application is the process of converting the application to run within a Docker container. Docker, an open-source project based on Linux containers, is a container engine which uses the Linux Kernel features like namespaces and control groups to create containers on top of an operating system and automates application deployment on the container. Docker provides a lightweight environment to run the application code and can run on a host with a compatible Linux® Kernel (e.g., Microsoft Windows®).

Figure 5:
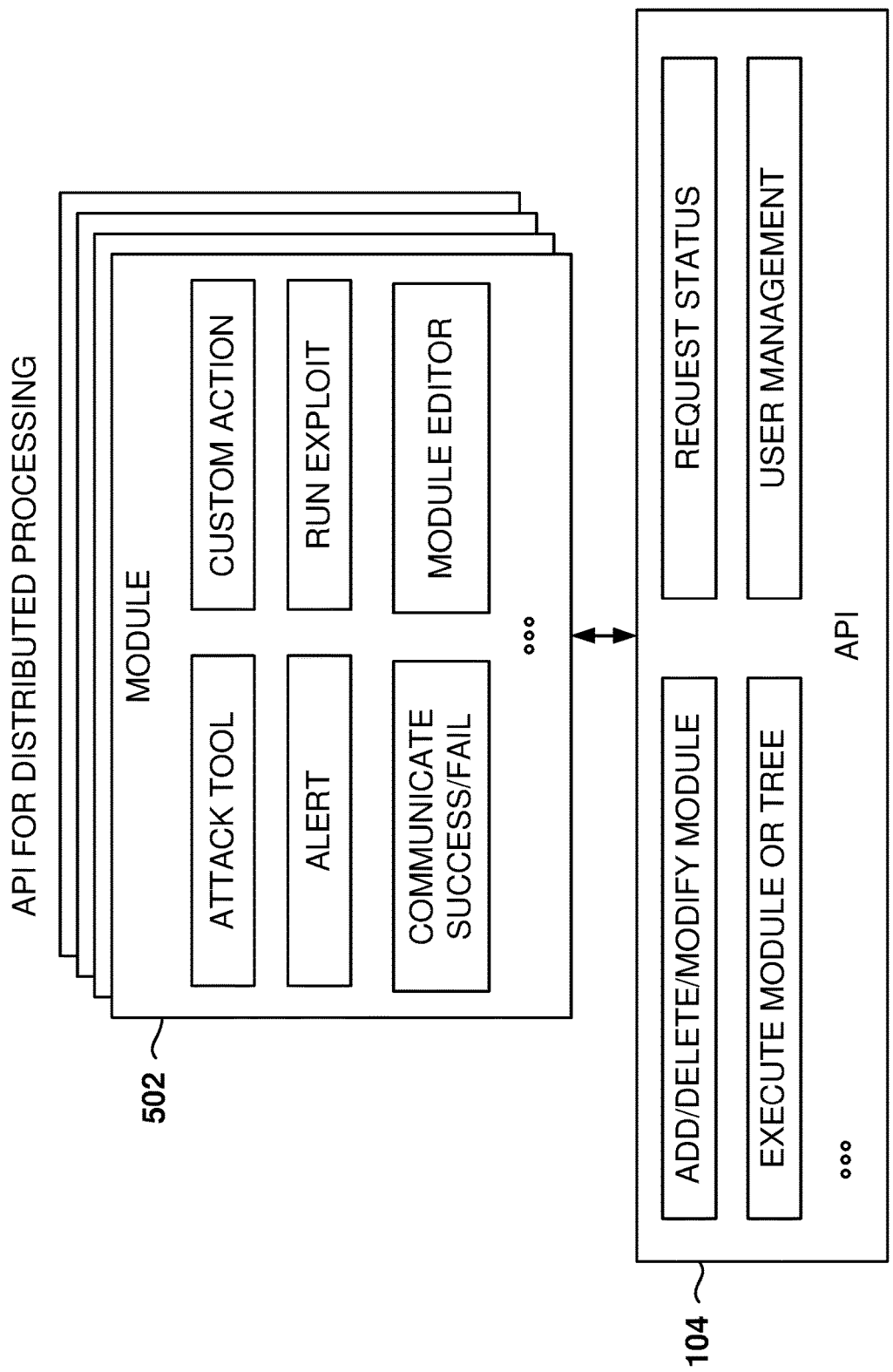
FIG. 5 illustrates some of the functions for a distributed Application Programming Interface (API) for penetration testing, according to some example embodiments.

FIG. 5 illustrates some of the functions for a distributed Application Programming Interface (API) 104 for penetration testing, according to some example embodiments. In some example embodiments, the API 104 includes options for adding, deleting, or modifying modules; requesting status on an ongoing penetration test, executing a module 502 or an attack-tree penetration test, user management (e.g., adding users, changing passwords), etc.

In some example embodiments, the API is implemented using Flask-RESTful API, but other types of APIs may also be implemented. Flask-RESTful API has dockerized containers to facilitate the distributed framework.

In some example embodiments, the attack tree is provided in a JSON document that describes the modules 502 that will be implemented, the dependencies, and the order of execution.

In some example embodiments, the module 502 includes one or more of an attack tool (e.g., script), a custom action to be executed for the module 502, an alert to be generated based on the results of running the module 502, a run exploit associated with the attack tool, results of the attack (e.g., success or failure), and a module editor for editing the module 502.

One of the tools is a customizable fuzzing engine that has the ability to mutate network packets and other data based on mutation strategies, such as byte flipping, FuzzDB injections (https://github.com/fuzzdb-project/fuzzdb) block shuffle append/write, overflow injection using random stream of bytes (dev/urandom), and format string injection.

Some of the ways to generate malicious input include using fuzzers include mutation fuzzing and generated fuzzing. The mutation fuzzing approach is used where initial input is required in the form of a network packet or API JSON request, and the fuzzing engine can apply a range (or all) of the mutaters mentioned above.

Figure 6A:
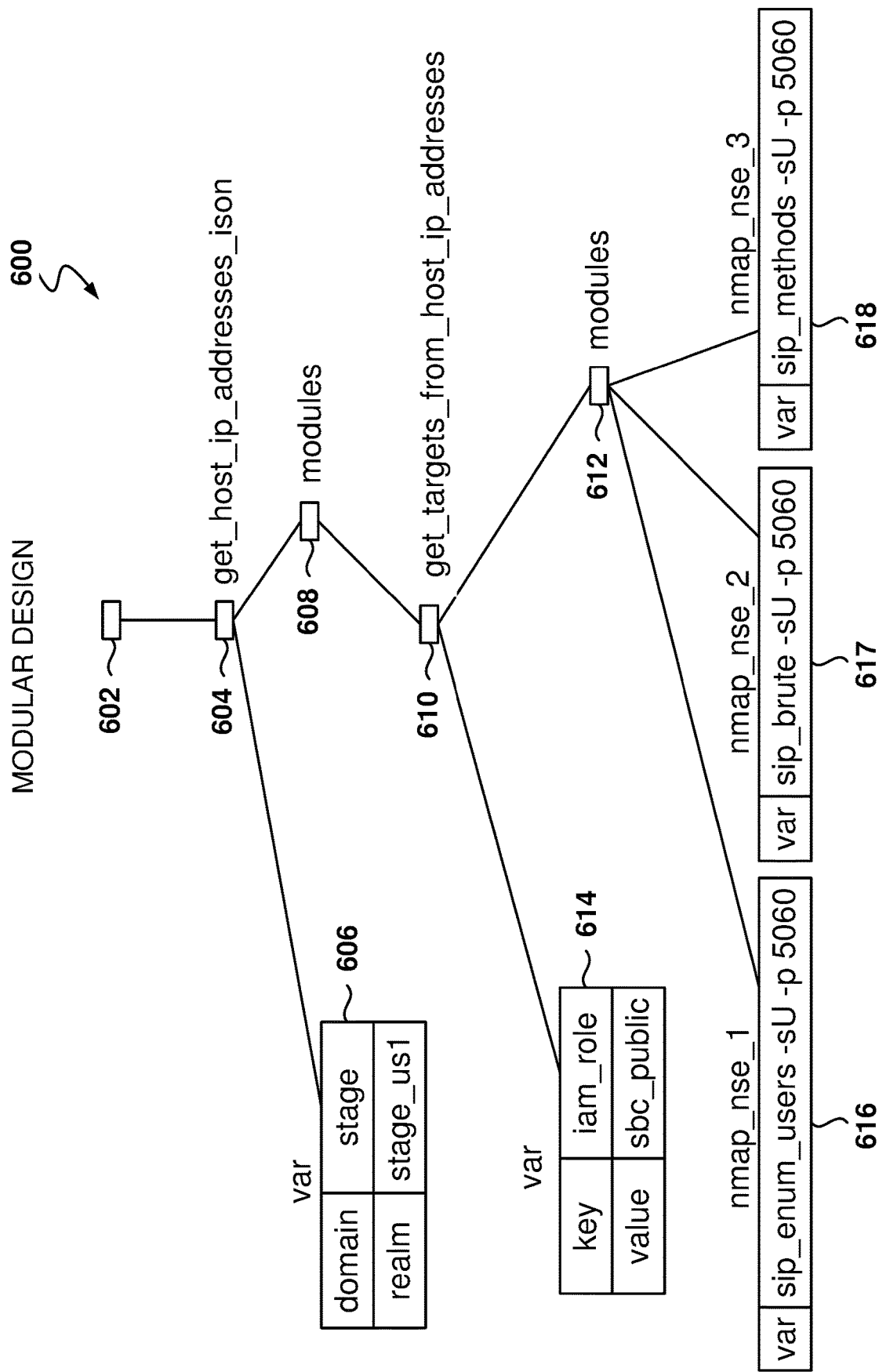
FIG. 6A illustrates the modular design of attacks for an attack-tree strategy, according to some example embodiments.

FIG. 6A illustrates the modular design of attacks for an attack-tree strategy, according to some example embodiments. The illustrated example is an attack tree 600 that includes several levels, and the attack tree 600 is traversed downward (from node 602 towards the bottom layer with nodes 616-618.

Node 604 performs attack get_host_ip_addresses_ison 604 to obtain the IP address of a host. The result of get_host_ip_addresses_ison 604 is passed to node 608, which transfers the IP address to node 610. The variables supplied by the user are defined in each module and allow for a basic programmatically structure to customize the module execution.

Node 610 performs a get_targets_from_host_ip_addresses attack using the IP address obtained in the attack of node 604. The results are transferred to node 612, which spans three attacks at the bottom layer having nodes 616-618.

The bottom layer includes three script attacks: sip_enum_users at node 616, sip brute at node 617, and sip_methods at node 618. The script sip_enum_users enumerates a Session Initiation Protocol (SIP) server's valid extensions (users). The script sip brute performs brute-force password auditing against SIP accounts and is often commonly associated with VoIP sessions. Further, the script sip_methods enumerates a SIP server's allowed methods (INVITE, OPTIONS, SUBSCRIBE, etc.) and works by sending an OPTION request to the server and checking for the value of the Allow header in the response. FIG. 6A shows example parameter values for the scripts (e.g., -sU, -p 5060). If any of the attacks at the bottom layer succeeds, then the attack is successful.

In some example embodiments, the API is used to configure these scripts into the attack tree 600. The tree 600 was created for testing telecom messages and simulating particular telecom functions. For example, a user connects to a telecom node and initiates an authentication request, but during the authentication request, the user sends malformed data or injection data.

Thus, the penetration manager is enabled to programmatically create this type of attack tree. Attack trees have been used to model possible attacks at a high level, but no prior solutions have offered a programmatic way to test systems using attack trees, including passing parameters from level to level to allow the traverse of the attack tree programmatically, without user intervention.

Here are a few other examples of attack trees:

Attack tree for penetration testing:
run a nmap scan against an IP range;
find all IPs listening on web ports;
run an application scanner on all the web endpoints to find web vulnerabilities;
exploit any file upload endpoints.

Attack tree #1 for defensive purpose and for regression testing:
run a nmap scan against an IP range;
find all IPs that have cleartext ports open (FTP, Telnet, etc.);
close those ports and run attack tree again.

Attack tree #2 for defensive purposes:
run the github-secrets module on code repo (internal code repository);
remove secrets found by module.

Attack tree #3 for defensive purposes:
create a module to check all email addresses of a company's domain against the haveibeenpwned.com API (https://haveibeenpwned.com/API/v2);
check accounts for 2FA;
check accounts for last login;
assign a "risk" score to each account.

Figure 6B:
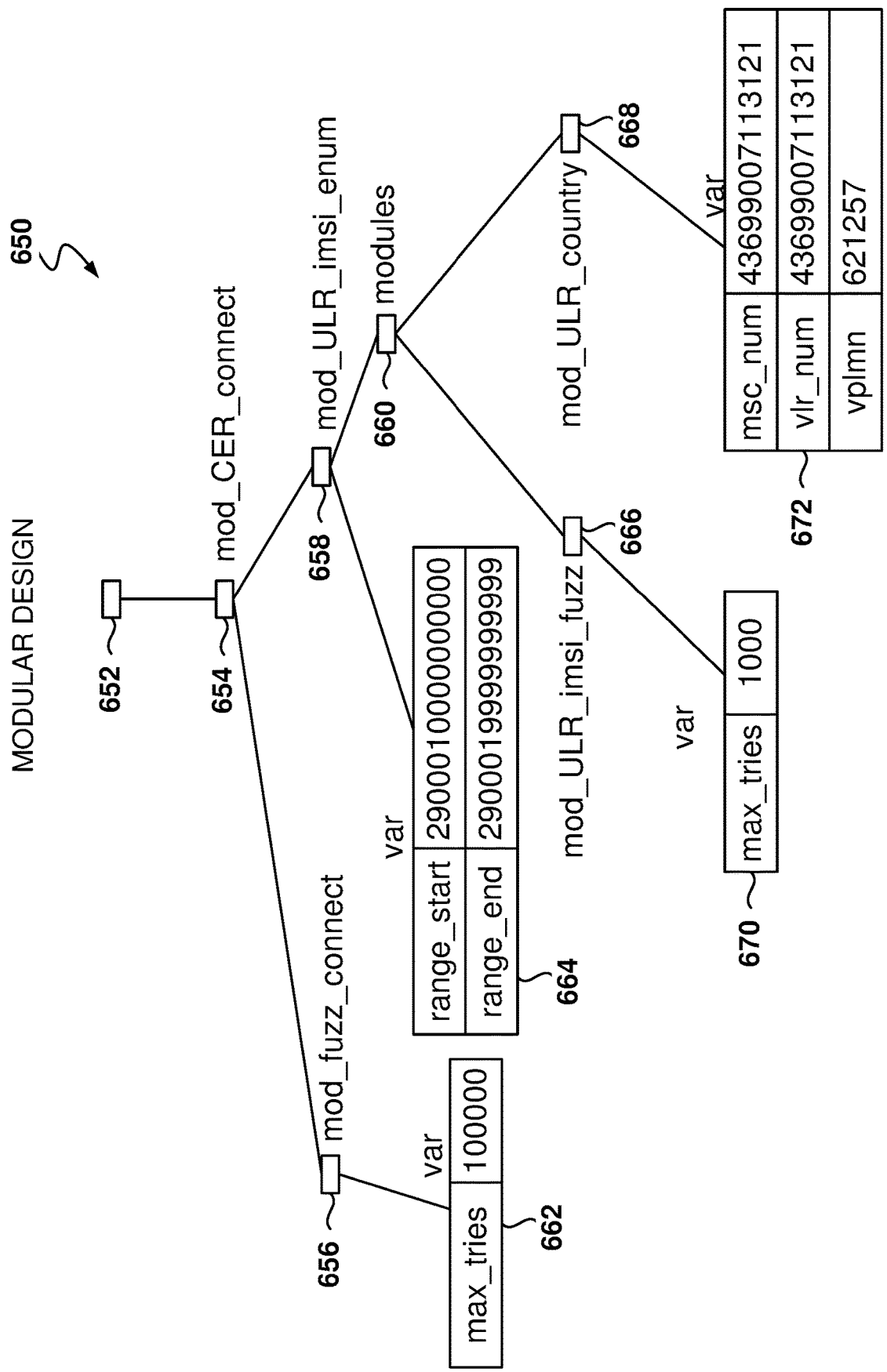
FIG. 6B is an attack tree for a telecom attack in the 4G/LTE realm, according to some example embodiments.

FIG. 6B is an attack tree 650 for a telecom attack in the 4G/LTE realm, according to some example embodiments. At operation 654 under root 652, an initial Capabilities Exchange Request (CER) connect message is sent, which establishes if a connection can be made to a Diameter Edge Agent (DEA).

Once a connection has been established, at operation 656, a fuzzing attack is executed, using a new CER message with the same parameters known to work, with a limit of 10,000 attempts 662.

After operation 656 completes, an enumeration attack 658 is executed to find an International Mobile Subscriber Identity (IMSI) that is valid in this network. The parameters 664 include the start and end values for the range to be attacked. The modules 660 include child modules 666 and 668.

If a valid IMSI is found, then fuzzing attack 666 is performed against a Location Update Message (a valid IMSI is required to craft a successful attack), with a maximum number of 100 tries 670.

Afterwards, an attempt is made 668 to move the subscriber to a network under the control of the tester using the Update Location Request (ULR) message with the parameters 672 that specify the Visited Public Land Mobile Network (VPLMN), which basically refers to an operator code and specific network elements within that VPLMN.

Once these operations are completed, the PCAP, logs, and results can be accessed either via a callback URL or via the API by the attacker.

This can continue to execute indefinitely, finding different IMSI through the enumeration attack and continuously attempting to compromise a subscriber.

Figure 7:
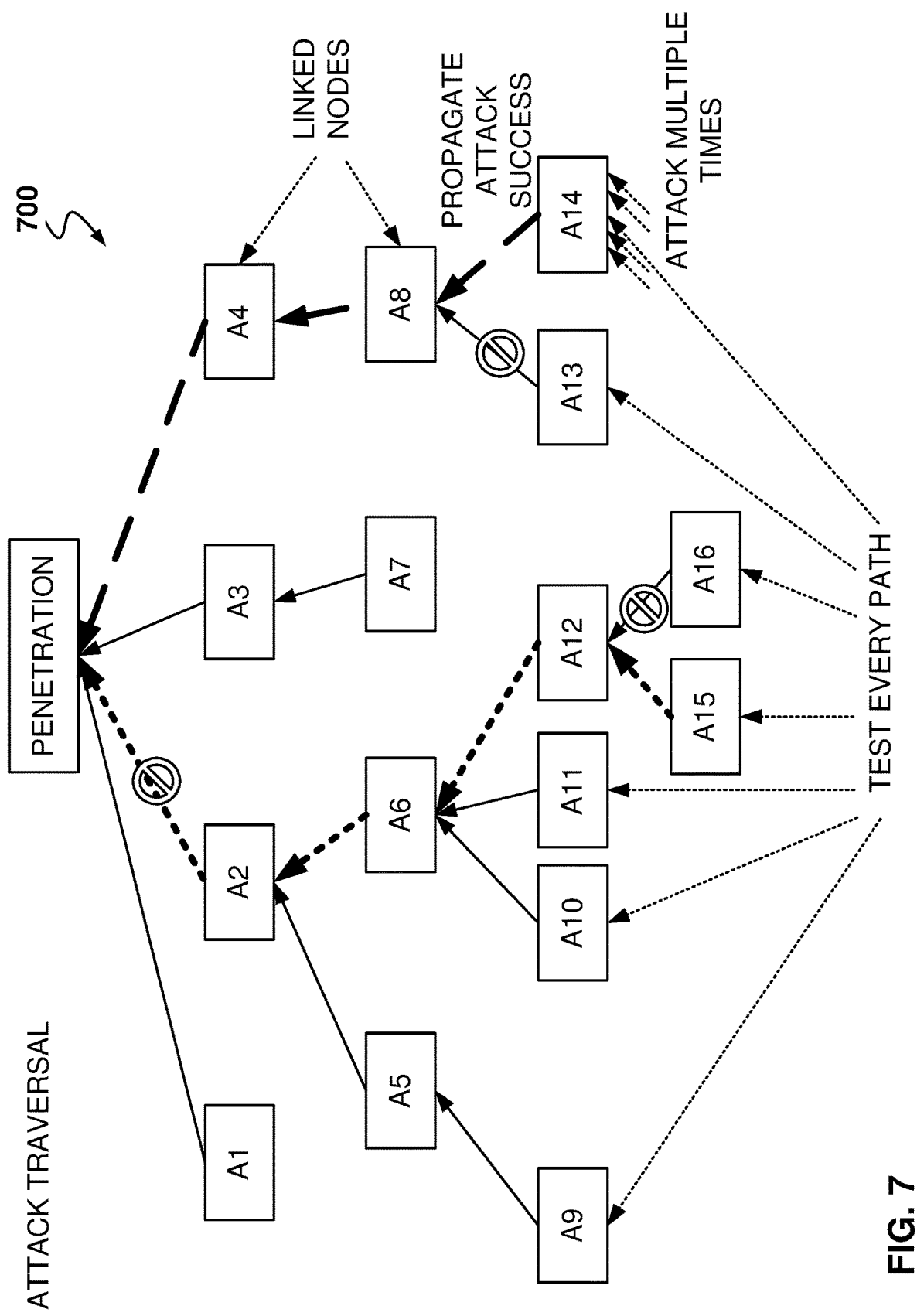
FIG. 7 illustrates the traversal of attacks across multiple paths of the attack tree, according to some example embodiments.

FIG. 7 illustrates the traversal of attacks across multiple paths of the attack tree 700, according to some example embodiments. The goal of attack tree 700 is for penetration (represented as the top node) of a particular resource. For simplicity of description, all branches of attack tree 700 are OR branches.

The goal of penetration testing is to test every possible path to the root, which is the successful penetration of the computing device. Further, attacks may be repeated multiple times to continuously look for vulnerabilities. By utilizing a pool of attackers, it is possible to execute multiple attacks from one attack-tree configuration. Additionally, the user may perform multiple API requests to start independent attackers.

Some of the nodes are linked, meaning that there are dependencies. For example, node A8 cannot be executed until either A13 or A14 are successful. When a node is successful at the attack, the attack continues with the parent node, unless the root has been reached.

The penetration attack may start at any node without children, in this example nodes A1, A7, A9, A10, A13, A15, A15, and A16. In this example, A15 succeeds so the attack continues to the parent (illustrated as a dotted line). By standardizing the communication between nodes, it is possible to make a very modular plug-and-play scanner that can perform complex actions (e.g., complex attack trees). However, attack A16 fails in this example. Similarly, A13 fails and A14 succeeds.

One attack reaches A2 via A15, A12, and A6, but A2 fails so penetration is not achieved. However, another path to the root is successful via A14, A8, and A4. Penetration has been reached.

When a node is successful, the node sends a signal to the parent indicating success and the child node may send one or more results obtained during the attack (e.g., a compromised port or a compromised IP address).

Here is an example of a simple attack tree written as a JSON document:

```
"modules":{
  "nmap_tcp_services":{
    "nmap_nse-1":{"var":"banner",
      "modules":{
        "nmap_nse-4":{"var":"http-chrono"},
              "nmap_nse-5":{"var":"http-slowloris --script-args=
          'http-slowloris.timelimit=10'"},
        "nmap_nse-6":{"var":"http-chrono"}
```

-continued

```
    }
        "nmap_nse-3":{"var":"ssh-auth-methods --scripts-args=
           'ssh.user=user' "},
    "exploit_ftp-7":{"var":"1.2"},
    "nmap_nse-7":{
       "ip":"127.0.0.1","var":"mysql-info"
       }
     }
   }
}
```

Figure 8:
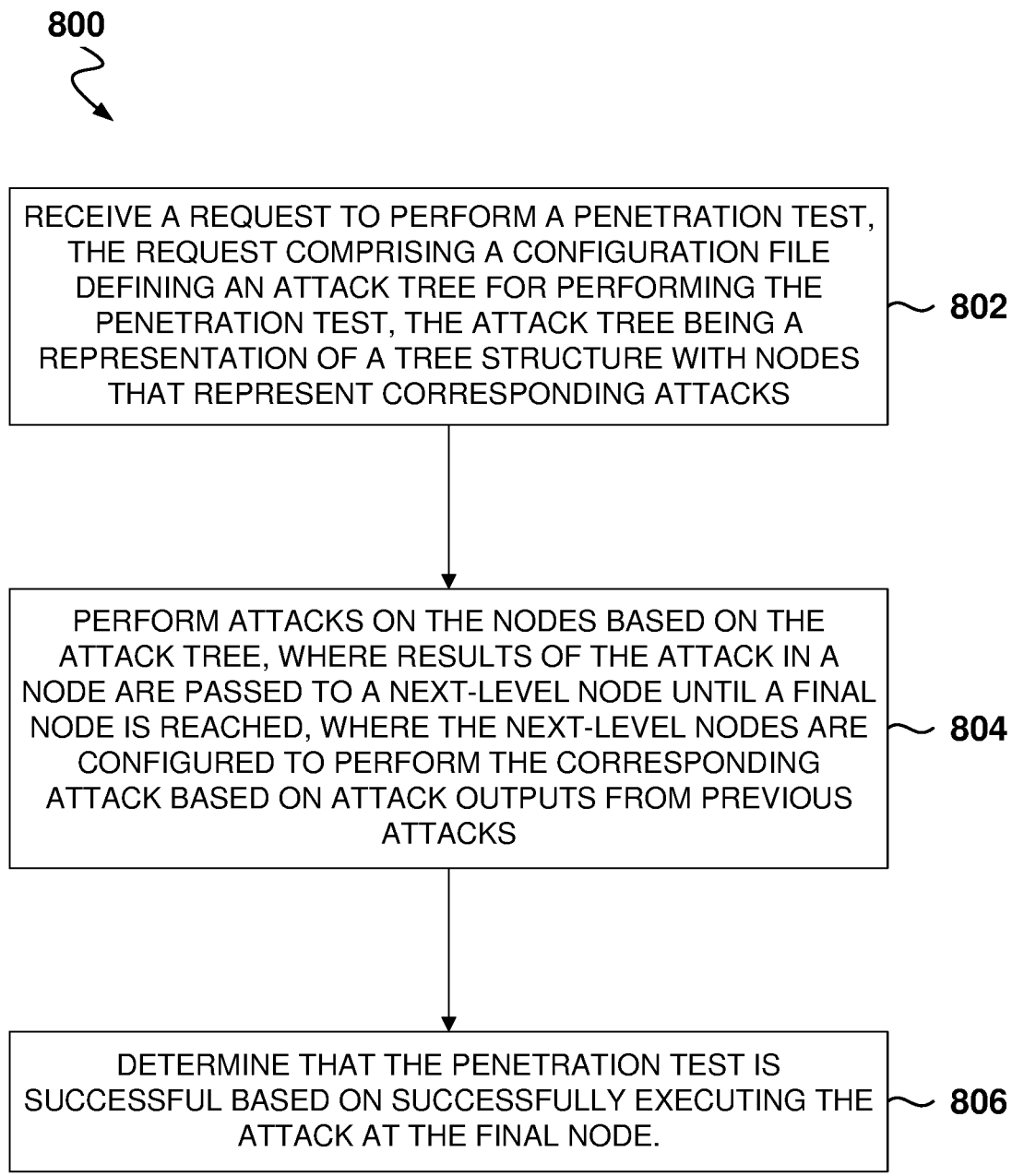
FIG. 8 is a flowchart of a method for penetration testing of computing systems, according to some example embodiments.

FIG. 8 is a flowchart of a method 800 for penetration testing of computing systems, according to some example embodiments. At operation 802, a penetration manager, having one or more processors, receives a request to perform a penetration test. The request comprises a configuration file defining an attack tree for performing the penetration test, and the attack tree is a representation of a tree structure with nodes that represent corresponding attacks.

From operation 802, the method 800 flows to operation 804 for performing, by the penetration manager, attacks on the nodes based on the attack tree. The results of the attack in a node are passed to a next-level node until a final node is reached, and the next-level nodes are configured to perform the corresponding attack based on attack outputs from previous attacks.

From operation 804, the method 800 flows to operation 806 for determining, by the penetration manager, that the penetration test is successful based on successfully executing the attack at the final node.

In one example, the penetration manager includes a queue of requests, an attack coordinator that schedules attacks from the queue of requests, and one or more attackers that perform the attacks.

In one example, the penetration manager coordinates operations with other penetration managers for a distributed implementation of the penetration testing, wherein the attack coordinator in the penetration manager is configured to send attacks to be performed by the attacker in the penetration manager or the attacker in any of the other penetration managers.

In one example, the method 800 further comprises providing, by the penetration manager, an application programming interface (API) for submitting the request to perform the penetration test, where the API includes options for: adding, deleting, or modifying attacks; requesting status on an ongoing penetration test; and requesting an attack.

In one example, child nodes are configurable to be combined using a logical AND operation or a logical OR operation.

In one example, the attack tree is one of an attack tree for penetration testing, for defensive testing of one or more internet protocol (IP) addresses, or for defensive testing of email address.

In one example, each attack is defined by a script selected from a group comprising web application scanners, port scanners, telephony operations, commercial offerings, and exploit tools.

In one example, the configuration file is provided in JavaScript Object Notation (JSON) format that describes attacks to be performed, dependencies, and order of execution.

In one example, a first attack includes scanning ports of a device to find a vulnerability of the device.

In one example, a second attack is associated with a script that includes a sequence of operations to test one vulnerability.

Another general aspect is for a penetration manager system that includes a memory comprising instructions and one or more computer processors. The instructions, when executed by the one or more computer processors, cause the penetration manager to perform operations comprising: receiving a request to perform a penetration test, the request comprising a configuration file defining an attack tree for performing the penetration test, the attack tree being a representation of a tree structure with nodes that represent corresponding attacks; performing attacks on the nodes based on the attack tree, wherein results of the attack in a node are passed to a next-level node until a final node is reached, wherein the next-level nodes are configured to perform the corresponding attack based on attack outputs from previous attacks; and determining that the penetration test is successful based on successfully executing the attack at the final node.

In yet another general aspect, a machine-readable storage medium (e.g., a non-transitory storage medium) includes instructions that, when executed by one or more processors of a penetration manager, cause the penetration manager to perform operations comprising: receiving a request to perform a penetration test, the request comprising a configuration file defining an attack tree for performing the penetration test, the attack tree being a representation of a tree structure with nodes that represent corresponding attacks; performing attacks on the nodes based on the attack tree, wherein results of the attack in a node are passed to a next-level node until a final node is reached, wherein the next-level nodes are configured to perform the corresponding attack based on attack outputs from previous attacks; and determining that the penetration test is successful based on successfully executing the attack at the final node.

Figure 9:
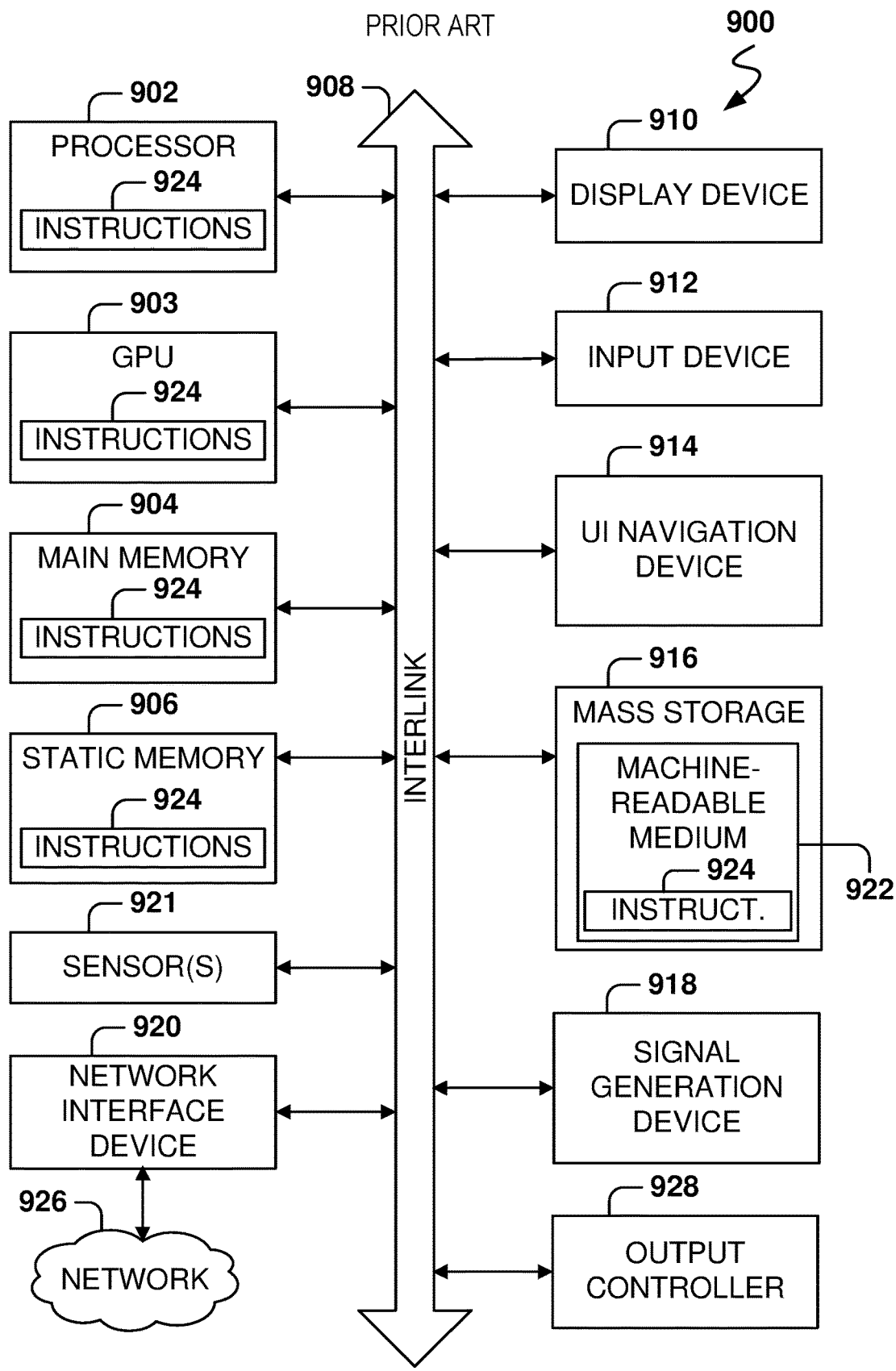
FIG. 9 is a block diagram illustrating an example of a machine upon or by which one or more example process embodiments described herein may be implemented or controlled.

FIG. 9 is a block diagram illustrating an example of a machine 900 upon or by which one or more example process embodiments described herein may be implemented or controlled. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in a peer-to-peer (P2P) (or other distributed) network environment. Further, while only a single machine 900 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 900 may include a hardware processor 902 (e.g., a central processing unit (CPU), a hardware processor core, or any combination thereof), a graphics processing unit (GPU) 903, a main memory 904, and a static memory 906, some or all of which may communicate with each other via an interlink (e.g., bus) 908. The machine 900 may further include a display device 910, an alphanumeric input device 912 (e.g., a keyboard), and a user interface (UI) navigation device 914 (e.g., a mouse). In an example, the display device 910, alphanumeric input device 912, and UI navigation device 914 may be a touch screen display. The machine 900 may additionally include a mass storage device (e.g., drive unit) 916, a signal generation device 918 (e.g., a speaker), a network interface device 920, and one or more sensors 921, such as a Global Positioning System (GPS) sensor, compass, accelerometer, or another sensor. The machine 900 may include an output controller 928, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, within the hardware processor 902, or within the GPU 903 during execution thereof by the machine 900. In an example, one or any combination of the hardware processor 902, the GPU 903, the main memory 904, the static memory 906, or the mass storage device 916 may constitute machine-readable media.

While the machine-readable medium 922 is illustrated as a single medium, the term "machine-readable medium" may include a single medium, or multiple media, (e.g., a centralized or distributed database, and/or associated caches and servers) configured to store the one or more instructions 924.

The term "machine-readable medium" may include any medium that is capable of storing, encoding, or carrying instructions 924 for execution by the machine 900 and that cause the machine 900 to perform any one or more of the techniques of the present disclosure, or that is capable of storing, encoding, or carrying data structures used by or associated with such instructions 924. Non-limiting machine-readable medium examples may include solid-state memories, and optical and magnetic media. In an example, a massed machine-readable medium comprises a machine-readable medium 922 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving, by a penetration manager having one or more processors, a request to perform a penetration test, the request comprising an attack tree according to which the requested penetration test is to be performed, the attack tree in the received request having a tree structure with nodes that each represent a corresponding attack;

performing, by the penetration manager, attacks on a target device based on the attack tree in the received request to perform the penetration test, wherein results of a first attack that corresponds to a first node of the attack tree are passed to a next-level attack that corresponds to a next-level node of the attack tree until a final attack that corresponds to a final node of the attack tree is performed; and determining, by the penetration manager, that the penetration test is successful based on successfully executing the final attack that corresponds to the final node.

2. The method as recited in claim 1, wherein the penetration manager includes a queue of requests, an attack coordinator that schedules attacks from the queue of requests, and one or more attackers that perform the attacks.

3. The method as recited in claim 2, wherein the attack coordinator in the penetration manager is configured to send attacks to be performed by at least one of the one or more attackers in the penetration manager or one or more further attackers in a further penetration manager.

4. The method as recited in claim 1, further comprising:
providing, by the penetration manager, an application programming interface (API) for submitting the request to perform the penetration test, wherein the API includes options for:
adding, deleting, or modifying attacks;
requesting status on an ongoing penetration test; and
requesting an attack.

5. The method as recited in claim 1, wherein outputs of nodes at a same level are configurable to be combined using a logical AND operation or a logical OR operation.

6. The method as recited in claim 1, wherein the attack tree is one of an attack tree for penetration testing, for defensive testing of one or more internet protocol (IP) addresses, or for defensive testing of email address.

7. The method as recited in claim 1, wherein each attack is defined by a script selected from the group consisting of a web application scanner, a port scanner, a telephony operation, a commercial offering, and an exploit tool.

8. The method as recited in claim 1, wherein a configuration file is provided in JavaScript Object Notation (JSON) format that describes attacks to be performed, dependencies, and order of execution.

9. The method as recited in claim 1, wherein a first attack includes scanning ports of a device to find a vulnerability of the device.

10. The method as recited in claim 1, wherein a second attack is associated with a script that includes a sequence of operations to test one vulnerability.

11. A penetration manager system comprising:
a memory comprising instructions; and
one or more computer processors, wherein the instructions, when executed by the one or more computer processors, cause the penetration manager system to perform operations comprising:
receiving a request to perform a penetration test, the request comprising an attack tree according to which the requested penetration test is to be performed, the attack tree in the received request having a tree structure with nodes that each represent a corresponding attack;
performing attacks on a target device based on the attack tree in the received request to perform the penetration test, wherein results of a first attack that corresponds to a first node of the attack tree are passed to a next-level attack that corresponds to a next-level node of the attack tree until a final attack that corresponds to a final node of the attack tree is performed; and
determining that the penetration test is successful based on successfully executing the final attack that corresponds to the final node.

12. The penetration manager system as recited in claim 11, wherein the penetration manager system includes a queue of requests, an attack coordinator that schedules attacks from the queue of requests, and one or more attackers that perform the attacks.

13. The penetration manager system as recited in claim 12, wherein the attack coordinator in the penetration manager system is configured to send attacks to be performed by at least one of the one or more attackers in the penetration manager system or one or more further attackers in a further penetration manager system.

14. The penetration manager system as recited in claim 11, wherein the instructions further cause the one or more computer processors to perform operations comprising:
providing an application programming interface (API) for submitting the request to perform the penetration test, wherein the API includes options for:
adding, deleting, or modifying attacks;
requesting status on an ongoing penetration test; and
requesting an attack.

15. The penetration manager system as recited in claim 11, wherein child nodes are configurable to be combined using a logical AND operation or a logical OR operation.

16. A non-transitory machine-readable storage medium including instructions that, when executed by one or more processors of a penetration manager, cause the penetration manager to perform operations comprising:
receiving a request to perform a penetration test, the request comprising an attack tree according to which the requested penetration test is to be performed, the attack tree in the received request having a tree structure with nodes that each represent a corresponding attack;
performing attacks on a target device based on the attack tree in the received request to perform the penetration test, wherein results of a first attack that corresponds to a first node of the attack tree are passed to a next-level attack that corresponds to a next-level node of the attack tree until a final attack that corresponds to a final node of the attack tree is performed; and
determining that the penetration test is successful based on successfully executing the final attack that corresponds to the final node.

17. The non-transitory machine-readable storage medium as recited in claim 16, wherein the penetration manager further includes a queue of requests, an attack coordinator that schedules attacks from the queue of requests, and one or more attackers that perform the attacks.

18. The non-transitory machine-readable storage medium as recited in claim 17, wherein the attack coordinator in the penetration manager is configured to send attacks to be performed by at least one of the one or more attackers in the penetration manager or one or more further attackers in a further penetration manager.

19. The non-transitory machine-readable storage medium as recited in claim 16, wherein the penetration manager further performs operations comprising:
providing an application programming interface (API) for submitting the request to perform the penetration test, wherein the API includes options for:
adding, deleting, or modifying attacks;

requesting status on an ongoing penetration test; and
requesting an attack.

20. The non-transitory machine-readable storage medium as recited in claim 16, wherein child nodes are configurable to be combined using a logical AND operation or a logical OR operation.

\* \* \* \* \*